Dec. 1, 1953   W. G. DION ET AL   2,660,943
SOUND AND HEATING APPARATUS FOR DRIVE-IN THEATERS
Filed Sept. 22, 1948
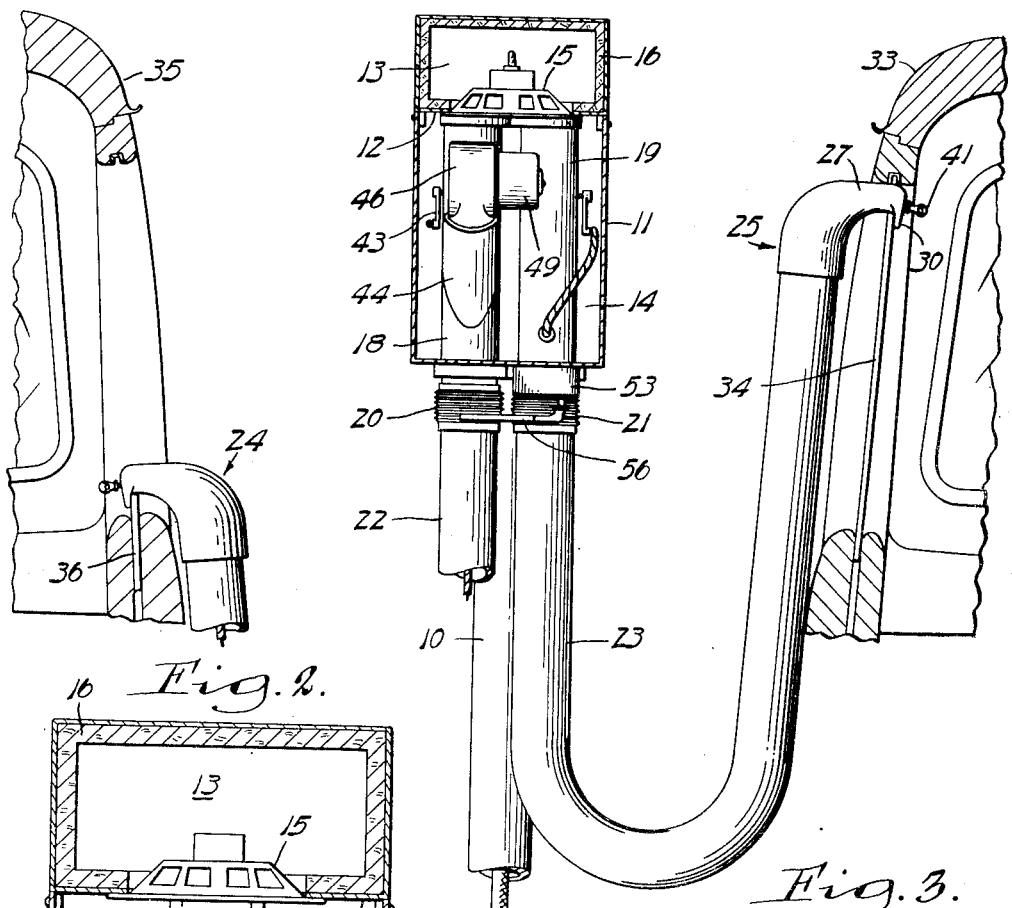
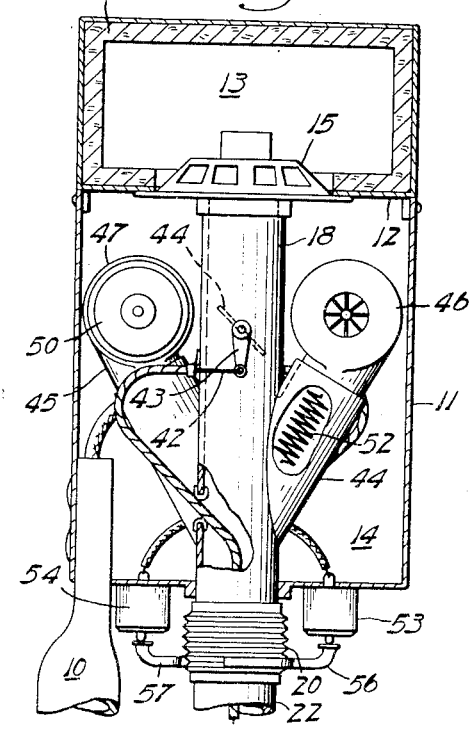
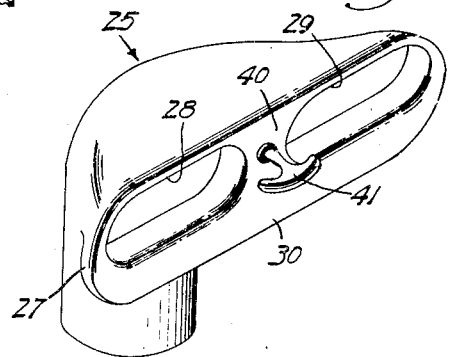
INVENTORS
Walter G. Dion and Gerald J. Dion
BY
Bean, Brooks, Buckley & Bean.
Attorneys

UNITED STATES PATENT OFFICE 2,660,943

SOUND AND HEATING APPARATUS FOR DRIVE-IN THEATERS

Walter G. Dion and Gerald J. Dion, Buffalo, N. Y.

Application September 22, 1948, Serial No. 50,626

1 Claim. (Cl. 98—2)

This invention relates to combined heating and sound apparatus for use particularly in drive-in theaters and the like.

Various sound transmitting and disseminating systems are currently in use in drive-in theaters, probably the most advanced to date being the so-called "in-a-car" speaker where individual speakers are provided for each vehicle, the speakers being hung upon a post when not in use and having a flexible electric cord connection therewith whereby the speaker may be removed from the post and placed in the car at any desired location.

It is economically prohibitive to provide speakers of good quality when used in this manner because patrons handle them very roughly, on occasion even tossing them out of the vehicle when ready to leave. Also, careless users sometimes drive away without removing speakers from within the vehicle, whereupon they may damage not only the speaker but the window or door of the vehicle as well, and the least that can happen is that the speaker is ripped loose from its connection with the post. Furthermore, theft of the speaker is fairly easy and would be greatly aggravated if good quality speakers were furnished.

A further handicap present in the operation of drive-in theaters is the weather. When cool weather prevails, operation is seriously curtailed or suspended entirely. Most passenger automobiles are equipped with heaters at the present time, but these require operation of the automobile engine if they are to provide heat. This is not only expensive to the automobile operator but is a hazardous and unsafe practice since when the vehicle is at rest its usual ventilating system is inoperative and noxious fumes often enter and collect in the passenger compartment.

The present invention provides novel apparatus for bringing sound to the interior of a passenger car in connection with drive-in theater operation and also provides novel heating means for supplying extraneous heat to the passenger car interior. The novelty of the present invention is enhanced by the fact that a single conduit means is utilized in accomplishing both objects jointly.

A preferred form of the apparatus of the present invention comprises a fixed support such as a post or the like which has associated therewith, suitably protected from the elements, a speaker unit and air heating and displacing means. A flexible conduit leading from the fixed support has one end thereof directed to the output side of the speaker, and the air heating and displacing means is adapted to direct heated air into and along the conduit. The opposite outlet end of the conduit may be introduced to the automobile passenger compartment at a window thereof, and in one form means are provided detachably securing the conduit in the window opening of the vehicle.

Since the speaker in the apparatus of the present invention is in a permanent, fixed and protected position it may be of far higher quality and fidelity than in the case of a portable speaker. Also, it may be heavier and of greater size, since convenience of handling is not a factor. Further, the speaker may be mounted in an acoustically correct baffle chamber to further greatly enhance the quality and fidelity of the sound projected thereby.

While a specific embodiment of the present invention is illustrated in the drawing and described in detail in the following specification, it is to be understood that this detailed embodiment is set forth by way of example only, and that the spirit and scope of the invention is not limited thereto or otherwise excepting as defined in the appended claim.

In the drawing:

Fig. 1 is a fragmentary general elevational view of one form of the apparatus of the present invention with the casing portion shown in cross-section, the apparatus being shown disposed between a pair of automobiles parked side by side;

Fig. 2 is a fragmentary view taken from the left of Fig. 1, on a somewhat larger scale and with the casing likewise in cross-section; and Fig. 3 is a detailed perspective view of the outlet fitting provided at one end of the sound and heat conduit.

In the embodiment herein illustrated and described the arrangement is such that a single mounting post supports dual apparatus whereby a car at either side thereof is served. This is a practical and efficient arrangement, but the present invention is not limited thereto.

Referring to Fig. 1, the numeral 10 designates a rigid mounting post which may be secured to the ground by any desired form of base construction or footing and 11 designates a generally rectangular casing which is secured to the upper end of post 10 and houses the sound speaker and the heat producing means. Casing 11 has an intermediate horizontal wall 12 which defines an upper chamber 13 which provides a baffle for the speaker and a chamber 14 therebelow which houses the heat producing means. A downwardly facing sound speaker 15 is secured in intermediate wall 12, and baffle chamber 13 may be lined with any desired form of acoustical material as at 16 in Figs. 1 and 2.

A pair of sound conducting conduits 18 and 19 extend downwardly through chamber 14 from immediately below the face of speaker 15 and at their lower ends are in communication with a pair of resiliently extensible annular bellows elements 20 and 21, respectively. The lower ends of the bellows elements 20 and 21 are in communication with flexible conduits 22 and 23, respectively, so that the conduits 22 and 23 comprise sound conducting extensions of the tubes 18 and 19.

At their outer ends the tubes 22 and 23 are provided with outlet fittings designated generally 24 and 25, respectively, in Fig. 1. Outlet fitting 25 is shown in detail in Fig. 3 as comprising a flaring outlet mouth 27 having outlet openings 28 and 29. At its lower edge outlet mouth 27 has a depending lip 30 which is adapted to be hooked over the upper edge of the usual vertically sliding side window of a motor vehicle.

In Fig. 1 the numeral 33 designates fragmentarily and schematically an automobile having a side window 34 which, in the instance illustrated at the right of Fig. 1, is closed to the extent permitted by the presence of outlet mouth 27 thereover. At the left-hand side of Fig. 1, a passenger vehicle 35 is indicated with its side window 36 in a more open position.

The main body portions of outlet fittings 24 and 25 are self-sustaining and may be relatively rigid. However, the lip formation 30 is arranged to be somewhat flexible so that no damage can result if a user of the device inadvertently drives off with the outlet fitting in the position indicated at the right of Fig. 1. In such case the lip merely flexes and the fitting 25 thus becomes disassociated from the car without damage. In one preferred form of the present apparatus, lengths of conduits 22 and 23 are such that they may hang freely from the bellows elements 20 and 21, straight down, without their outlet fittings 24 and 25 touching the ground.

Referring to Fig. 3, the bridge portion 40 which lies between openings 28 and 29 of each of the outlet fittings 24 and 25 gives bearing to an axially sliding control element 41 which engages one end of a Bowden wire whose opposite end is designated 42 in Fig. 2, such opposite end being connected to a rock arm 43 which is fixed to a butterfly valve 44 in conduit 18. In Fig. 2 the butterfly valve 44 of conduit 18 is shown in a midway position, but in Figs. 1 and 3 the control element 41 which serves conduit 19 is shown in its innermost position, in which position the associated butterfly valve (not shown) will be closed or nearly so and sound volume emanating from the openings 28 and 29 will be at a minimum.

Referring to Fig. 2 particularly, each of the conduits 18 and 19 has a Y connection, designated 44 and 45, respectively. Each of the conduits 44 and 45 is provided with an air displacing fan 46 and 47, respectively, the fans in turn having electric operating motors 49 and 50, respectively. Between each of the fans 46 and 47 and the points where the Y connections merge with conduits 18 and 19 are electric heating elements such as indicated schematically at 52 in the case of connection 44, the latter being broken away to illustrate the heating element.

Each of the heating elements of the connections 44 and 45 are controlled by normally open micro-switches; the switch for controlling heating element 52 being designated 53 in Fig. 2, and the switch for controlling the heating element 44 being designated 54 in Fig. 2. Bellows 20 of conduit 22 has secured to its lower part an outwardly projecting arm 56 which is movable upwardly to engage the operating element of micro-switch 53 and thus close switch 53. Similarly, bellows 21 of conduit 19 has an outwardly projecting arm 57 for engaging the operating member of micro-switch 54 to close the same upon upward movement of arm 57.

When conduit 22, for instance, is hanging freely from bellows 20, its weight stretches the bellows a sufficient distance to hold arm 56 downwardly out of contact with the operating member of switch 53, and the energizing circuit of heating element 52 is accordingly open. When a user grasps conduit 22 near its outer end or by grasping outlet fitting 24, and raises the conduit to a position for use, the load on bellows 20 is reduced sufficiently to cause the latter to contract and arm 56 moves up to close switch 53 and thus automatically energizes the heating element 52 and the air displacing fan motor 49 of fan 46.

It will be seen from the foregoing that the individual heating devices and the heat circulating fans will be in operation only when a particular unit is being used by a patron, without any attention on the part of either the patron or an attendant. The speaker 15 consumes very little energy and may be continuously energized when the theater is in operation. The sound level in the general vicinity of the speaker is relatively low and unobjectionable when the conduits are not availed of in listening.

What is claimed is:

Combined sound and heat transmitting apparatus for use in drive-in theaters and the like comprising a relatively fixed support, a flexible conduit extending from said support and having an inlet end at said support and an outlet portion for positioning adjacent to a vehicle, a speaker element at said inlet end for directing audible vibrations into said conduit whereby they emanate from said outlet portion, means at said support for moving heated air into said conduit beyond said inlet end and for circulating the same to said outlet portion, valve means disposed between the inlet end and the point where the heated air is introduced to the conduit for adjustably controlling the volume of sound delivered by said conduit, and manual means adjacent the outlet portion of said conduit for adjusting said valve means.

WALTER G. DION.
GERALD J. DION.

References Cited in the file of this patent

UNITED STATES PATENTS

| Number | Name | Date |
|---|---|---|
| 669,944 | Merrill | Mar. 12, 1901 |
| 961,157 | Perry | June 14, 1910 |
| 1,185,987 | Emerson | June 6, 1916 |
| 1,466,093 | Erb | Aug. 28, 1923 |
| 1,481,870 | Luhnow | Jan. 29, 1924 |
| 1,952,514 | Selby | Mar. 27, 1934 |
| 2,045,180 | Douthwaite | June 23, 1936 |
| 2,085,470 | Pieper | June 29, 1937 |
| 2,091,594 | Innes | Aug. 31, 1937 |
| 2,096,023 | Albertson | Oct. 19, 1937 |
| 2,161,995 | Cahill | June 13, 1939 |
| 2,218,212 | Nassos | Oct. 15, 1940 |
| 2,529,425 | Sharp | Nov. 7, 1950 |